(No Model.)
T. P. CONANT.
APPLICATION OF ACCUMULATORS TO ELECTRIC LIGHTING.
No. 373,883. Patented Nov. 29, 1887.
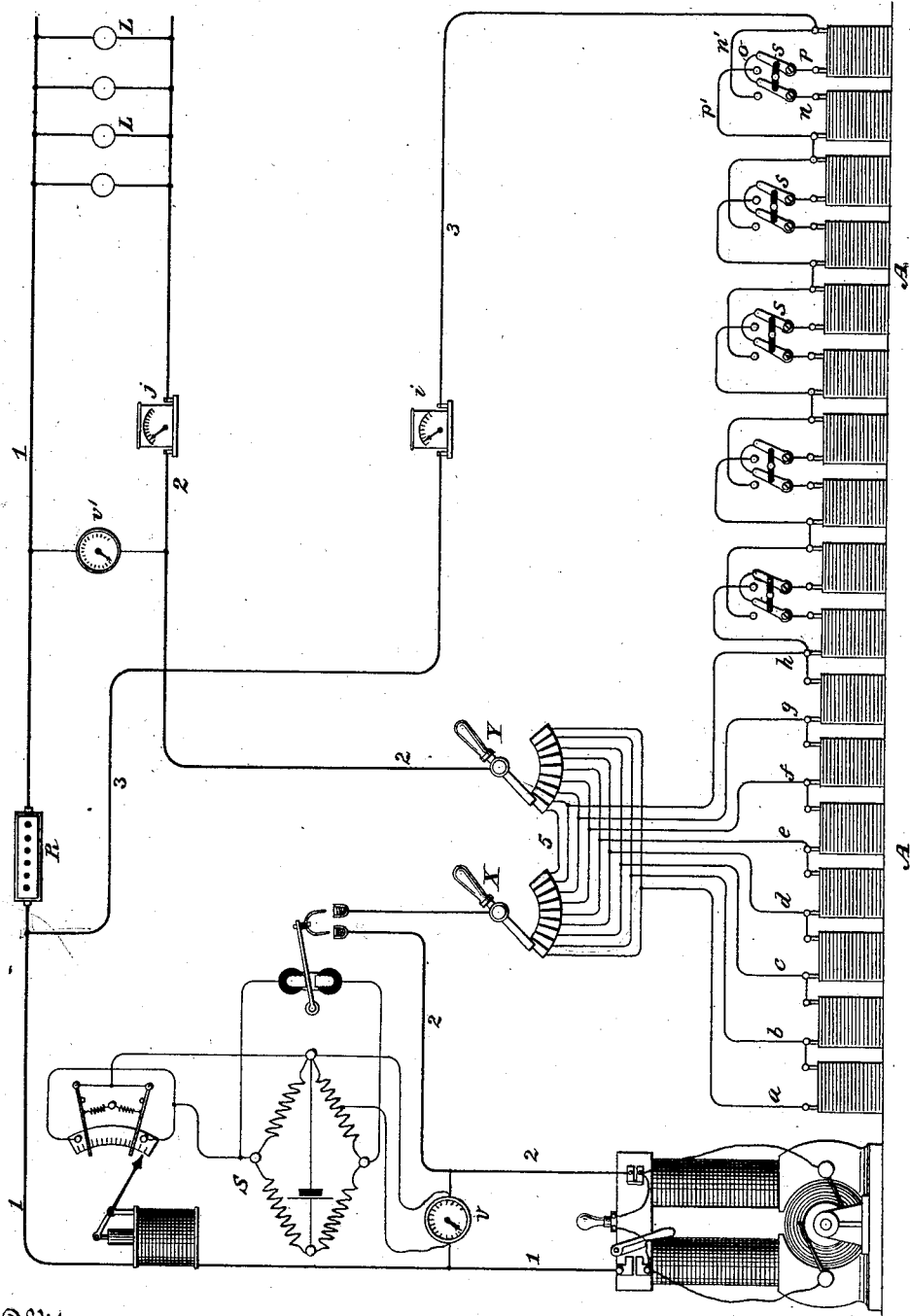
Witnesses
Geo. W. Breck.
Wm B. Vansize
Inventor
Thomas P. Conant

UNITED STATES PATENT OFFICE.

THOMAS P. CONANT, OF BROOKLYN, NEW YORK, ASSIGNOR TO THE ELECTRICAL ACCUMULATOR COMPANY, OF NEW YORK.

APPLICATION OF ACCUMULATORS TO ELECTRIC LIGHTING.

SPECIFICATION forming part of Letters Patent No. 373,883, dated November 29, 1887.

Application filed June 20, 1887. Serial No. 241,903. (No model.)

*To all whom it may concern:*

Be it known that I, THOMAS P. CONANT, a citizen of the United States, and a resident of Brooklyn, in the county of Kings and State of New York, have invented certain new and useful Improvements in the Application of Accumulators to Electric Lighting, of which the following is a specification.

My invention relates to an improvement in the application of accumulators or secondary batteries to electric lighting and the supply of electrical energy.

The invention consists in an improved arrangement of primary generator, batteries, switches, circuits, and instruments whereby the generator may feed directly into the working-circuit alone, or may feed said circuit and charge the battery simultaneously, while an unvarying electro-motive force is maintained in all cases at the translating devices—*i. e.*, the lamps.

It consists, further, in arranging the battery-cells in pairs with a switch, so that the same pair of cells are always connected in multiple arc whenever such connection becomes necessary, for experience has shown that when a cell is at one time connected in multiple with one cell and at another time with another cell there is likely to be a variation between the two in respect to quantity, electro-motive force, or some other condition, so that one will partially short-circuit the other, or will act to vary its condition, while if the same pair are always used under similar conditions such action is unlikely to occur.

I provide two switches so arranged and connected with the battery and the main that any part of the battery may be in the charging-circuit while the same or a different part of said battery may be in the working-circuit. An adjustable resistance is so located with respect to the dynamo, the battery, and the working-circuit that the required electro-motive force may be employed to charge all the accumulators, while only the required electro-motive force is present at the terminals of the lamps.

The accompanying drawing illustrates my invention.

D is a dynamo provided with switch and indicating-lamp, as is well known, feeding into main circuit 1 2. A is a series of accumulators or secondary batteries, one terminal connected to the main lead 1. The other lead, 2, may be connected to any point in the battery by switch Y. L L indicate lamps fed from the mains. S is an automatic switch mechanism operating a circuit-closer in the main circuit to close said circuit when the electro-motive force of the dynamo rises to the proper point, and to break said circuit when the current varies too widely from the prearranged and proper strength. This is fully described in my patent, No. 360,375, dated March 29, 1887.

One terminal of accumulators A is permanently connected to main lead 1 by conductor 3. The switch Y has a series of insulated contacts connected, respectively, to different points of the accumulator A by wires *a b c*, &c. By this means any required number of cells may be included in the working-circuit by moving the arm of Y connected to main lead 2 on the lamp end of the lead. X is a similar switch having insulated contacts connected, respectively, with the tap-wires *a b c*, &c. The arm of switch X is connected to main lead 2 on the dynamo end of the circuit. One of the contacts of switch Y is connected with a contact of switch X by a conductor, 5. The result is that I may place any required number of cells between the leads 1 and 2 and the remainder of the cells in the lead 2, or I may place all the cells between the leads 1 and 2, to feed the lamps and at the same time operate the dynamo.

R is an adjustable resistance placed in a main lead, between the battery and working-circuit.

It is frequently necessary to multiple-arc a portion of the cells. For this purpose I provide four-point switch *s*. Two contacts are connected by the conductor *o*. The positive pole *p* of one cell is connected to one insulated arm. The negative pole *n* of a second cell is connected to the second insulated arm. The negative pole of the first cell is connected to a fixed contact by wire *n'*. The positive pole of the second cell is connected to another fixed contact by wire *p'*. To connect this pair of cells in series the insulated arms are placed upon that pair of contacts which are electrically united. To connect the pair in multiple the insulated arms are carried to the two contacts respectively joined to conductors $p'$ and $n'$. By this arrangement the same pair of cells are always subjected to the same treatment—that is, they are either in circuit in series, in multiple, or out of circuit. Several pairs of cells of the series are similarly connected with a switch like $s$.

I provide an ammeter, $i$, to show the output of the battery; an ammeter, $j$, to show the consumption in the working-circuit; a voltmeter, $v$, to show the potential at the dynamo, and a voltmeter, $v'$, to show the potential at the lamp-terminals.

The operation of this arrangement of apparatus is described as follows: Starting the dynamo into operation, we place the arms X and Y upon contacts connecting with conductor 5, and the lamps are fed directly. An electro-magnet of the automatic switch mechanism S controls means whereby the charging-circuit is kept open until the electro-motive force of the generator rises to a predetermined point. When the charging-circuit is closed, its control is transferred to another electro-magnetic device operated by fluctuations in the strength of current. These devices operate, as fully described in my aforesaid patent, to disconnect the batteries from the charging-circuit in the event of any abnormal increase or decrease in the strength of current. To introduce the battery we put arms X and Y in connection with conductor $a$. The whole accumulator is now in process of being charged and is feeding into the working-circuit. Let us assume that the lamps L require sixty volts, and that there are thirty cells having an electro-motive force of sixty volts. To have an effective electro-motive force at the dynamo with which to charge the accumulator, we must considerably exceed sixty volts. Let us run the dynamo at seventy volts. While the battery is but partially charged most of this will be absorbed; but as the battery approaches its maximum charge its counter electro-motive force will cause this higher force to exhibit itself injuriously at the lamp-terminals. To avoid this I vary the resistance R. At the beginning there is but little resistance plugged in at R; but as the battery increases in charge more electro-motive force is manifest at the lamp-terminals, and while carefully watching the indicating-instruments I increase the resistance at R, and so proceeding, by varying the resistance, I maintain a uniform electro-motive force at the lamp-terminals. When the battery has its full charge, I stop the dynamo, remove the resistance R, and by moving the switches X and Y place the number of cells between leads 1 and 2 to furnish the required electro-motive force.

If the electro-motive force of the entire number of cells is excessive, I reduce said force by moving one or more of the switches $s$ so as to connect the pair of cells to which said switches are connected in multiple arc. By thus permanently connecting the cells in pairs with a switch of the kind described these two cells are always subjected to the same charge and discharge, and therefore are maintained in the best condition for service.

By the use of indicating-instruments located at the points described the process of changing from dynamo to accumulators as a source of energy is greatly facilitated.

What I claim, and desire to secure by Letters Patent, is—

1. The combination of the dynamo-electric machine, main-conductors connected thereto, translating devices connected to said conductors, a series of accumulator-cells having their opposite terminals connected to the main conductors, a switch for varying the number of cells in series, and an adjustable artificial resistance in the main conductor between the accumulator and translating devices, to compensate for changes in fractions of the unit variation in electro-motive force effected by the operation of said switch, substantially as and for the purpose set forth.

2. The combination of a dynamo-electric machine, main conductors connected thereto, translating devices connected to the said conductors, a secondary battery connected to said conductors between the dynamo and lamps, an adjustable resistance between the battery and lamps, an indicating-instrument between the dynamo and battery, and an indicating-instrument between the battery and lamps, whereby the process of shifting from the dynamo to the battery as a source of energy may be performed without varying the current at the lamp-terminals.

3. The combination of a dynamo-electric machine, a main conductor connected thereto, translating devices connected to said conductor, a series of accumulator-cells having tap-wires connected with two series of insulated terminals, a movable contact connected to one end of a divided main conductor, and a movable contact connected to the other end of said divided conductor, whereby a part or all of the accumulator may be placed in the charging-circuit and a part or all of said accumulator may be placed in the working-circuit, substantially as described.

4. The combination of a dynamo-electric machine, a main-conductor connected thereto, translating devices connected to said conductor, a series of accumulator-cells having a series of tap-wires connected with two series of radially-disposed insulated segments, and two radial arms forming the terminals of a divided main conductor moving, respectively, in contact with said segments, whereby a part or all of the accumulator may be placed in the charging-circuit and a part or all thereof may be placed in the working-circuit.

5. The combination of a series of accumulator-cells connected in pairs with a switch for connecting each pair in multiple arc or in series at pleasure.

6. The combination of a dynamo, an accumulator consisting of a series of cells, lamps L, and switches for connecting part or all the accumulator in the charging or in the working circuit, and for connecting each pair of the
5 accumulator-cells in series or in multiple arc at pleasure, substantially as described.

Signed at New York, in the county of New York and State of New York, this 18th day of June, A. D. 1887.

THOMAS P. CONANT.

Witnesses:
WM. B. VANSIZE,
DANIEL E. DELAVAN.